United States Patent Office 3,578,636
Patented May 11, 1971

3,578,636
METHOD FOR MANUFACTURING ALTERNATING COPOLYMERS OF CONJUGATED VINYL COMPOUNDS AND OLEFINIC UNSATURATED COMPOUNDS
Kohei Nakaguchi, Osaka, Shohachi Kawasumi, Niihama-shi, Masaaki Hirooka, Ibaraki-shi, Hiroshi Yabuuchi, Takatsuki-shi, and Hiroyoshi Takao, Ashiya-shi, Japan, assignors to Sumitomo Chemical Company, Ltd., Osaka, Japan
No Drawing. Continuation-in-part of application Ser. No. 537,705, Mar. 28, 1966. This application Nov. 18, 1969, Ser. No. 877,862
Claims priority, application Japan, Mar. 31, 1965, 40/18,822
Int. Cl. C08g 25/00
U.S. Cl. 260—63            10 Claims

---

ABSTRACT OF THE DISCLOSURE

Vinyl compounds having a carbonyl or nitrile group at the conjugated position form a complex with an organo-aluminum halide. When these components are subjected to reaction in the presence of a terminally unsaturated olefinic hydrocarbon and oxygen or an organic peroxide, an alternating copolymer of the conjugated vinyl compound and the olefinic monomer is obtained. The oxygen or organic peroxide promotes the desired copolymerization reaction of a mixture of these monomers to produce an alternating copolymer.

---

This application is a continuation-in-part of application Ser. No. 537,705, filed Mar. 28, 1966, now abandoned.

This invention relates to a method for manufacturing copolymers of conjugated vinyl compounds and olefinic unsaturated compounds, particularly to a method for manufacturing alternating copolymers of acrylonitrile or derivatives of acrylic acid and olefinic unsaturated compounds.

The present inventors have offered already a method for manufacturing copolymers by contacting a conjugated vinyl compound having a nitrile, carbonyl or thiocarbonyl group at the conjugated position relative to its vinyl group, for example, acrylonitrile or acrylic acid ester (hereinafter this kind of monomer will be referred to as complexant monomer) and an olefinic unsaturated compound (this kind of monomer will be referred to as olefinic monomer) having the general formula of

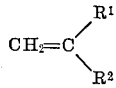

wherein $R^1$ and $R^2$ each is a hydrogen atom, a halogen atom, a hydrocarbon or a halogen-containing hydrocarbon group with an organo-aluminum halogen compound of the general formula of

$$AlR_n{}^I X_{3-n}$$

(wherein $R^I$ is a hydrocarbon group, X is a halogen and $n$ is 1 to 2) or a combination of at least two components selected from the group of aluminum compounds which have the following general formulas,

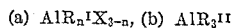

(a) $AlR_n{}^I X_{3-n}$, (b) $AlR_3{}^{II}$ (wherein $R^{II}$ is a hydrocarbon group) and (c) $AlX'_3$ (wherein $X'$ is a halogen atom). That kind of polymerization and had heretofore never been known. It will be called "Complex Polymerization" hereinafter.

In this method of polymerization, it is important that an aluminum compound is coordinated with the complex-ant monomer. The copolymerization has been considered to proceed through this kind of coordination compound. The polymerization is characterized by the fact that an excellent result is obtained by using the complexant monomer and an aluminum compound at a molar ratio of about 1:1. But from a commercial point of view, it is not desirable to consume such a large amount of an aluminum compound. According to subsequent experiments, it has been observed that it is not necessary to use an aluminum compound at a molar ratio of 1:1 to the complexant monomer. On the contrary, a high rate of polymerization can be attained in some cases by using the aluminum compound at a comparatively small ratio. As a general tendency, however, the activity of polymerization falls substantially if the ratio of an aluminum compound is below a certain degree. On the other hand, even if an aluminum compound and the complexant monomer are used at a molar ratio of 1:1, a sufficient activity of polymerization cannot be attained in some cases, depending on the combination of monomers and other conditions of polymerization.

The present inventors have discovered that the activity of polymerization is improved remarkably by adding oxygen or an organic peroxide to the above-mentioned system of polymerization. This presents the advantage that the rate of polymerization of the system is not only promoted but also the amount of an aluminum compound to be used can be reduced substantially. The method of this invention is based on this kind of discovery.

The method of this invention is characterized in carrying out the polymerization with addition of oxygen or an organic peroxide in the method for manufacturing copolymers by contacting an olefinic unsaturated compound of the general formula of

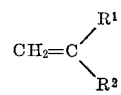

(wherein $R^1$ and $R^2$ each is a hydrogen atom, a halogen atom, a hydrocarbon group having 1 to 20 carbon atoms, or a halogen-containing hydrocarbon group having 1 to 20 carbon atoms) and a conjugated vinyl compound seletced from the group consisting of acrylonitrile and a compound of the general formula of

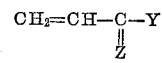

(wherein Z is an oxygen or a sulfur atom, Y is a member selected from the group consisting of Z'R, Z'H, Z'Me, NR'R", R, a halogen and a hydrogen atom, Z' is an oxygen or a sulfur atom, R is a hydrocarbon group having 1 to 20 carbon atoms, R' and R" are the same or different members selected from a hydrogen atom and a hydrocarbon group having 1 to 20 carbon atoms, including the case where R' and R" are bonded togther at other parts than the nitrogen atom and Me is a part corresponding to the monovalence of the element of groups 1 to 3 of Mendeleev's Periodic Table or an ammonium radical) with an organo-aluminum halogen compound having a general formula of

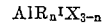

$$AlR_n{}^I X_{3-n}$$

(wherein $R^I$ is a hydrocarbon group, X is a halogen atom and $n$ is an arbitrary value of 1 to 2) or a combination of at least two components selected from the group consisting of aluminum compounds having the following general formulas,

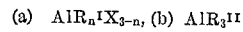

(a) $AlR_n{}^I X_{3-n}$, (b) $AlR_3{}^{II}$ (wherein $R^{II}$ is a hydrocarbon group) and (c) $AlX'_3$ (wherein $X'$ is a halogen atom).

The halogen atoms which are used for $R^1$ and $R^2$ in an olefinic monomer having the general formula of

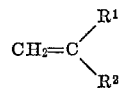

which is used in the method of this invention are chlorine, bromine, iodine and fluorine atoms. As the hydrocarbon groups or halogen-containing hydrocarbon groups, such groups as alkyl, aryl, aralkyl, alkylaryl and cycloalkyl and above-mentioned groups of which the hydrogen atoms are substituted with halogen atoms are preferable. Particularly, as those compounds, aliphatic α-olefins (including vinylidene compounds), styrene and substituted styrenes, their halogen substituted products, especially halogenated vinyl or vinylidene compounds and, allyl halides are preferable.

To mention certain concrete examples of those compounds, they are such olefinic hydrocarbons as ethylene, propylene, butene-1, isobutene, pentene-1, hexene-1, heptene-1, octene-1, 2-methyl-butene-1, 3-methyl-butene-1, 2-methyl-pentene-1, 4-methyl-pentene-1, 4-methyl-hexene-1, decene-1, dodecene-1, octadecene-1, 4-phenyl-butene-1, styrene, α-methyl-styrene, α-butyl-styrene, p-methyl-styrene, m-methyl-styrene, vinyl cyclobutane, vinyl cyclohexane, isopropenyl benzene, vinyl naphthalene and allyl benzene, and such halogen-containing olefinic hydrocarbons as vinyl chloride, vinyl bromide, vinyl iodide, allyl chloride, allyl bromide, allyl iodide, 4-chloro-butene-1, 3-chloro-butene-1, 3-bromo-pentene-1, 4,4,4-trichloro-butene-1, p-chloro-styrene, o-chloro-styrene, m-bromo-styrene, p-iodo-styrene, p-fluoro-styrene, 4-chloro-vinyl cyclohexane, p-chloro-allylbenzene, 2,4 - dichloro-styrene, 2,6 - dichloro-styrene, 2,4 - difluoro-styrene, 3-trifluoro-methyl-styrene, 4-chloro - 1 - vinyl-naphthalene, vinylidene chloride, vinylidene bromide, 2-chloro-propene-1, 1-bromo - 1 - chloro-ethylene, 2-chloroallyl-chloride, methallyl chloride and 1-1-bis (p-chlorophenyl) ethylene. Those olefinic unsaturated compounds, of which an e-value in the Q-e scheme proposed by price-Alfrey is less than 1.0, particularly less than 0.5, give desirable results.

The complexant monomer in the method of this invention is acrylonitrile or a compound having the general formula of

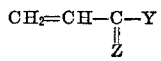

where Y and Z have been already described. The representative examples of these compounds are an acrylate, a thiolacrylate, a thionacrylate, a dithioacrylate, an acrylamide, a thioacrylamide, an N-substituted acrylamide, an N-substituted thioacrylamide, an N,N-disubstituted acrylamide, an N,N-disubstituted thioacrylamide, an acryloyl halide, a thioacryloyl halide, acrylic acid, thiolacrylic acid, thionacrylic acid, dithioacrylic acid, salts of these acids, acrolein and a vinyl ketone. As the hydrocarbon groups each having 1 to 20 carbon atoms which are represented by R, R' and R" in relation to Y, are illustrated, for example, such groups as alkyl, aryl, aralkyl, alkylaryl and cycloalkyl. As the halogen atoms, chlorine, bromine, iodine and fluorine atoms are used. Me represents the parts of the elements of Groups 1 to 3 of the Mendeleev Periodic Table which correspond to monovalence or an ammonium radical. As those elements, are illustrated, for example, lithium, sodium, potassium, rubidium, cesium, copper, silver, beryllium, calcium, strontium, barium, magnesium, zinc, cadmium, mercury, boron, aluminum and gallium. The part corresponding to monovalence, as here defined, means M (M representing the elements of Groups 1 to 3 of the Mendeleev Periodic Table and the same hereinafter) itself in the case of a monovalent element, M/2 in the case of a bivalent element and M/3 in the case of a trivalent element. So it corresponds concretely to

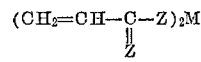

as to a bivalent element and

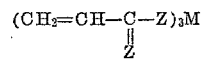

as to a trivalent element. Of these, the monovalent salt, that is, the salts of the elements of Group 1 and ammonium salt are especially preferable. That NR'R" includes the case where R' and R" are bonded together at the parts other than N means that, for example,

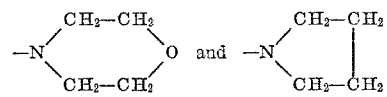

that is, a morpholino group and a pyrrolidino group are included therein. The following are their examples to which, however, they are not limited: methyl acrylate, ethyl acrylate, isopropyl acrylate, n-butyl acrylate, t-butyl acrylate, n-amyl acrylate, n-octyl acrylate, n-dodecyl acrylate, tetradecyl acrylate, octadecyl acrylate, vinyl acrylate, allyl acrylate, phenyl acrylate, o-tolyl acrylate, benzyl acrylate, cyclohexyl acrylate, cyclobenzyl acrylate, (2-chloroethyl) acrylate, (β-chloroallyl) acrylate, (dimethylamino-ethyl) acrylate, (2 - ethoxyethyl) acrylate, (2 - nitropropyl) acrylate, methylthiol acrylate, ethylthiol acrylate, isopropylthiol acrylate, phenylthiol acrylate, methylamide, N-methylacrylamide, N-ethylacrylamide, N-n-butylacrylamide, N-n-hexylacrylamide, N-n-octylacrylamide, N-2-ethylhexylacrylamide, N-n-dodecylacrylamide, N-stearylacrylamide, N-cyclohexylacrylamide, N-tolylacrylamide, N-methylthioacrylamide, N,N-dimethylacrylamide, N-methyl-N-ethylacrylamide, acrylylmorpholine, acrylylpyrrolidine, N,N-dimethylthioacrylamide, acryloyl chloride, acryloyl bromide, acryloyl iodide, thioacryloyl chloride, acrylic acid, thiolacrylic acid, thionacrylic acid, dithioacrylic acid, sodium acrylate, potassium acrylate, zinc acrylate, aluminum acrylate, ammonium acrylate, acrolein, methyl vinyl ketone, ethyl vinyl ketone, phenyl vinyl ketone, cyclohexyl vinyl ketone and vinyl-[4-methyl-naphthyl-(1)]-ketone.

As the aluminum compounds having the general formulas of

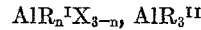

and $AlX'_3$, those having hydrocarbon groups as $R^I$ and $R^{II}$, halogen atoms as X and X' and an arbitrary value of 1 to 2 as $n$ are mentioned. As the $R^I$ and $R^{II}$, hydrocarbon groups having 1 to 20 carbon atoms are especially preferable, for example, those having alkyl, alkenyl, aryl, aralkyl, alkarylaryl groups. For example, those having, as $R^I$ and $R^{II}$, methyl, ethyl, propyl, butyl, hexyl, octyl, decyl, dodecyl, stearyl, phenyl, tolyl, naphthyl, benzyl, cyclopentadienyl and cyclohexyl groups are mentioned. To mention them concretely, as the compounds having the general formula of

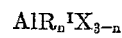

there are methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum dibromide, ethylaluminum diiodide, vinylaluminum dichloride, allylaluminum dichloride, ethylaluminum dichloride, ethylaluminum sesquichloride, ethylaluminum sesquibromide, ethylaluminum sesquifluoride, methylaluminum sesquichloride, methylaluminum sesquibromide, phenylaluminum sesquiiodide, diethylaluminum chloride, diethylaluminum fluoride, ethylphenyl aluminum chloride and dicyclohexylaluminum chloride, and as those having that of $$AlR_3^{II}$$

trimethylaluminum, triethylaluminum, tripropylaluminum, tributylaluminum, trihexylaluminum, tridecylaluminum, triphenylaluminum, tricyclohexylaluminum and tribenzylaluminum, and as those having that of $AlX'_3$, aluminum chloride, aluminum bromide, aluminum iodide and aluminum fluoride.

The organic peroxides used in this invention, include organic compounds having peroxide bonds in general, for example, diacyl peroxide, ketone peroxide, aldehyde peroxide, ether peroxide, hydroperoxide, dihydrocarbil peroxide, peracid ester, percarbonate and percarbamate. Representative examples of the organic peroxides include benzoyl peroxide, lauroyl peroxide, caprylyl peroxide, 2,4-dichlorobenzoyl peroxide, 4 - nitrobenzoyl peroxide, 4-methoxybenzoyl peroxide, 4-chlorobenzoyl peroxide, acetyl peroxide, stearoyl peroxide, phthaloyl peroxide, methyl ethyl ketone peroxide, cyclohexanone peroxide, t-butyl hydroperoxide, p-menthane hydroperoxide, diisopropylbenzene hydroperoxide, cumene-hydroperoxide, di-t-butyl peroxide, dicumyl peroxide, t-butylcumyl peroxide, t-butyl perbenzoate, t-butyl perisobutyrate, t-butyl peracetate, t-butyl peroxypivarate, phenyl percarbamate, diisopropyl percarbonate and t-butyl perisopropylcarbonate.

The most important characteristics of the above-mentioned complex polymerization is that alternating copolymers comprising an olefinic monomer bonded alternately with a complexant monomer at a molar ratio of 1:1 can be obtained. Those alternating copolymers are the novel products which have never been known except by this kind of complex polymerization which has been discovered by the present inventors. It is important that an alternating copolymer is obtained only when a monomer chosen from the group of olefinic monomers is combined with a monomer chosen from the group of complexant monomers. The alternating copolymer cannot be obtained by copolymerization of combination of monomers chosen from the same group of olefinic or complexant monomers.

As the aluminum compounds used in the present invention, any arbitrary one cannot be used. For obtaining an alternating copolymer, aluminum bonded with an organic group and that bonded with a halogen atom must exist in the system of polymerization. That is, the alternative copolymer cannot be obtained with $$AlR_3^{II}$$

or $AlX'_3$ alone. As a more important characteristic, these aluminum compounds are coordinated with the complexant monomer. The copolymerization is considered to proceed through this kind of coordinated complex. This is the important factor to give the alternating copolymer. This kind of coordination takes place to the carbonyl or nitrile groups of the monomers, as confirmed by infrared analysis and other techniques.

The method of this invention is characterized by the fact that oxygen and an organic peroxide promote remarkably the reaction of the complex polymerization which has been discovered by the present inventors. Needless to say, however, an alternating copolymer cannot be obtained merely by adding oxygen or an organic peroxide to an olefinic monomer and a complexant monomer. Further a compound having the general formula of $$AlR_3^{II}$$

alone lacks the capacity of polymerizing the complexant monomer but it is known that when oxygen or an organic peroxide is added to it, the resultant compound has an excellent activity to polymerize methacrylic acid esters and acrylic acid esters particularly. But even if a catalyst system prepared by combining oxygen or an organic peroxide with a compound having the general formula of $$AlR_3^{II}$$

is added to the mixture of an olefinic monomer and a complexant monomer, an alternating copolymer cannot be obtained. It is well-known that the radical polymerization of a vinyl monomer is effected by combination of trialkyl boron with oxygen but this kind of catalyst system does not give the alternating copolymer of this invention. In other words, the method of this invention differs from the conventionally known simple radical polymerization using an organometallic compound.

The promoting mechanism of oxygen and an organic peroxide in the method of this invention is not entirely clear, but it many not be thought that they act similarly as a radical initiator in the case of polymerization of methyl methacrylate or acrylonitrile coordinated with zinc chloride. This is also evident from the fact that any arbitrary radical initiator does not promote the polymerization in the method of this invention, in which an excellent promotion of the polymerization is achieved only by addition of oxygen or an organic peroxide, while the addition of other radical polymerization initiators, for example, azo-bis-isobutyronitrile, is not effective.

Different from the conventional radical polymerization, the method of this invention has a high activity of polymerization even at an extremely low temperature. This suggests that it has such an extremely low activation energy as has never been observed.

Generally speaking, an aluminum compound is used at an arbitrary ratio, for example, 0.005 to 1.5 mol per mol of a complexant monomer in many cases.

In the method of this invention, oxygen can be added to the system of polymerization by any arbitrary method. In the case of non-volatile monomers, they can be polymerized by blowing oxygen, air or an inert gas containing a small amount of oxygen. Or in the case of gaseous monomers, they can be blown into the system as a mixture of the monomer and oxygen. Further, dissolved oxygen in a liquid monomer can be also used. But it is not preferable in this method to allow an organo-aluminum compound to become contacted with a substantial amount of oxygen in advance. An alkoxy compound produced by reaction of an organoaluminum compound and oxygen does not seem to become an active substance.

The amount of oxygen or organic peroxide should be at least 0.01 mole percent based on the amount of the organo-aluminum halogen compound. Generally, the range of the amount is 0.01 to 100 mole percent, and preferably 0.1 to 20 mole percent. Based on the complexant monomer, the amount of oxygen or organic peroxide is generally 0.001 to 20 mole percent or more, and preferably 0.01 to 5 mole percent. An organic peroxide having a greater rate of radical decomposition has a larger promoting effect and can be used more effectively in a small amount.

The alternating copolymer is generally obtained without regard to the composition of the monomer mixture but since the rate of polymerization, yield, molecular weight and other properties of the polymer are generally influenced by mixing ratio of the monomers, it is suitable to choose the proper composition of monomers according to its purpose. Generally, good results are obtained by using an elefinic monomer in excess.

The order of adding the monomers and the aluminum compounds can be selected arbitrarily. For example, after the monomers are mixed together, the aluminum compounds can be added successively to the resultant mixture or after the same or different aluminum compounds are made to contact respectively with each of the monomers, the resultant mixtures can be mixed together.

The polymerization temperature can be selected arbitrarily within a range from an extremely low temperature of $-150°$ C. to that of $+100°$ C. The polymerization systems of the present invention have generally high activity so that the polymerization is finished, for example, in several or up to about ten minutes even at −78° C. Such a low temperature at which homo-polymerization hardly takes place is suitable for obtaining a pure copolymer. It is generally necessary to carry out the polymerization in the absence of water.

The polymerization can be carried out under a pressure from atmospheric to such a high pressure as up to 100 kg./cm.$^2$. Generally, the reaction proceeds sufficiently under the atmospheric pressure.

On operating the method of this invention, bulk polymerization can be carried out in the liquid monomers, or usual inert solvents can be used. As the solvents, there are mentioned, for example, propane, butane, pentane, hexane, heptane, octane, ligroin, petroleum ether, other mixed solvents from petroleum source, benzene, toluene, xylene, cyclohexane, methylcyclohexane, methylene, dichloride, ethylene dichloride, trichloroethylene, tetrachloroethylene, butyl chloride, chlorobenzene and bromobenzene. Such compounds as form stable complexes with aluminum compounds are not desirable as the solvents. Particularly those forming more strongly bonded complexes than those between the complexant monomer and the aluminum compounds are not suitable as the solvents.

After the polymerization is finished, the resultant polymer is refined and recovered by the usual method of after-treatment. Such an after-treatment as the method using an alcohol, an alcohol-hydrochloric acid, an aqueous solution of hydrochloric acid, an alkali or the like or other methods which have been conventionally used in the cationic polymerization using a Lewis acid and in polymerization using the Ziegler-Natta type catalyst may be tionally used. But it is also possible to separate and recover the catalyst components from the produced polymer by adding such compounds as form complexes with them, without decomposing them.

For a clearer understanding of this invention, the following specific examples are given. These examples are used by way of illustration only and are not intended to be a limitation of the invention.

EXAMPLE 1

A 100 ml. three-necked flask was evacuated, flushed with nitrogen and cooled to −78° C. with Dry Ice-methanol. Into the flask, 62 ml. of toluene and 2.76 g. of methyl acrylate were introduced under an atmosphere of nitrogen and mixed together uniformly, and then 8 mmol of ethylaluminum sesquichloride ($AlEt_{1.5}Cl_{1.5}$) was added to the resultant mixture. The mixture solution was heated up to 25° C. with stirring, to which 5 g. of styrene containing 0.19 g. of benzoyl peroxide was added. After the polymerization for 5 hours, methanol was added to the content for terminating the polymerization and then the insoluble matter was taken out by filtration. The solid thus obtained was washed with methanol and dried at 50° C. at a reduced pressure. As a result, 6.04 g. of the white copolymer was obtained. The copolymer was dissolved in acetone and reprecipitated by acetone and methanol for purifying it. Elementary analysis of purified product: C, 75.59%; H, 7.33%, agreed well with the calculated values of a 1:1 copolymer, C, 75.76%; H, 7.42%. Its intrinsic viscosity as measured at 30° C. in benzene was 1.23 dl/g.

In the same experiment, when benzoyl peroxide was not added, 2.55 g. of the copolymer was obtained.

EXAMPLE 2

When 0.02 g. of benzoyl peroxide was used under the same condition as in Example 1, 3.92 g. of the alternating copolymer having an intrinsic viscosity of 2.50 dl./g., was obtained by the polymerization for 3 hours. When benzoyl peroxide was not added under the same conditions, the yield was 1.71 g. In the case of using azo-bis-isobutyronitrile in place of benzoyl peroxide by the same molar quantity, the yield was 1.79 g. No substantial difference was observed in the yield by the addition of this substance.

Further, under the same conditions, in the case of using, in place of benzoyl peroxide, methyl ethyl ketone peroxide, di-t-butyl peroxide, dicumyl peroxide, t-butyl perbenzoate, diisopropyl percarbonate or acetyl peroxide by the same molar quantity, the same promotion of the polymerization was observed. Moreover, under the same conditions, in the case of using, in place of ethylaluminum sesquichloride, diethylaluminum chloride, methylaluminum sesquibromide, or mixture of tridodecylaluminum and aluminum chloride, the promotion by benzoyl peroxide of the polymerization was observed as well.

EXAMPLE 3

All the operation of Example 1 was repeated excepting addition of 0.032 g. of lauroyl peroxide in place of benzoyl peroxide. As a result, 5.00 g. of the white copolymer was obtained. Elementary analysis of the product: C, 75.40%, H, 7.30%, agreed well with the calculated values of the alternating copolymer.

EXAMPLE 4

The same apparatus as in Example 1 was cooled to −78° C. Into the flask, 62 ml. of toluene and 2.76 g. of methyl acrylate were introduced in an atmosphere of nitrogen and mixed together uniformly. To the resultant mixture, 16 mmol. of ethylaluminum sesquichloride ($AlEt_{1.5}Cl_{1.5}$) was added. The mixture solution was heated up to 25° C. with stirring, to which then 5 g. of styrene was added. Nitrogen gas containing 5% of oxygen was blown into it at a flow rate of 10 l. per hr. After 40 minutes, methanol was added to the content to terminate the polymerization. Then the reaction product was taken out and the insoluble matter was taken by filtration. The solid thus obtained was washed sufficiently with methanol and then dried at 50° C. at a reduced pressure. As a result, 3.04 g. of the white copolymer was obtained. The copolymer was dissolved in acetone and reprecipitated by acetone and methanol for refining it. Elementary analysis of the product: C, 75.84%; H, 7.46%, agreed well with the calculated values of the 1:1 copolymer, C, 75.78%; H, 7.42%. Its intrinsic viscosity as measured at 30° C. in benzene was 1.77 dl/g.

In the same experiment, when oxygen was not blown into the reaction mixture, the yield was 1.51 g.

Under the same conditions of polymerization, in the case of using, in place of methyl acrylate, acryloyl chloride, acrylic acid, N-ethyl acrylamide, acrolein, methyl vinyl ketone, cyclohexyl acrylate, or sodium acrylate, the effect of oxygen was observed as well. Further, under the same conditions, in the case of using, in place of propylene ethylene, α-methyl styrene, allylbenzene, octadecene-1, or vinyl cyclohexane, the same effect of oxygen was also observed.

EXAMPLE 5

A 300 ml. glass autoclave was cooled to −78° C. evacuated and flushed with nitrogen. Into the autoclave 8.6 g. of methyl acrylate, 0.03 g. of benzoyl peroxide and 8.4 g. of propylene were introduced in an atmosphere of nitrogen and mixed together uniformly. To the resultant mixture, a solution of 2.5 mmol. of ethylaluminum sesquichloride ($AlEt_{1.5}Cl_{1.5}$) in 11.6 ml. of toluene was added. Then the polymerization was carried out with stirring at 0° C. for 5 hours. The reaction was performed in a homogeneous state. Methanol was added to the content for terminating the polymerization and then the insoluble matter was taken by filtration. The solid thus obtained was washed sufficiently with methanol and then dried at 50° C. at a reduced pressure. As a result, 11.9 g. of the white copolymer was obtained. The copolymer was dissolved in acetone and reprecipitated by acetone and methanol for refining it. Elementary analysis of the product: C, 64.42%; H, 9.17%, agreed well with the calculated values of the 1:1 copolymer, C, 65.60%; H, 9.44%. Its intrinsic viscosity as measured at 30° C. in benzene was 1.60 dl/g.

In the same experiment, when benzoyl peroxide was not contained, only a trace amount of the polymer was produced.

EXAMPLE 6

All the operation of Example 5 was repeated excepting for the addition of 12.8 g. of n-butyl acrylate in place of methyl acrylate. The polymerization was carried out with stirring at 0° C. for 4 hours. As a result, 12.6 g. of the copolymer was obtained.

EXAMPLE 7

A 500 ml. three-necked flask was evacuated, flushed with nitrogen and cooled to −78° C. with Dry Ice-methanol. Into the flask, 100 ml. of toluene and 8.6 g. of methyl acrylate were introduced in an atmosphere of nitrogen and mixed together uniformly. To the resultant mixture, 25 mmol. of a 20% solution of ethylaluminum sesquichloride (AlEt$_{1.5}$Cl$_{1.5}$) in toluene was added. The mixture solution was heated to −10° C. with stirring, to which 0.05 g. of benzoyl peroxide dissolved in 56 g. of liquefied isobutylene was added. Then the polymerization was carried out at −10° C. for 72 hours. After the reaction, methanol was added to the content for terminating the polymerization. Then the content was taken out and the insoluble matter was taken by filtration. The solid thus obtained was washed sufficiently with methanol and then dried at 50° C. at a reduced pressure. As a result, 9.57 g. of the white copolymer was obtained. The copolymer was dissolved in acetone and reprecipitated by acetone and methanol. Elementary analysis of the product: C, 67.90%; H, 10.04%, agreed well with the calculated values of the 1:1 copolymer, C, 67.57%; H, 9.92%. Its intrinsic viscosity as measured at 30° C. in benzene was 2.62 dl/g.

EXAMPLE 8

In a 200 ml. four-necked flask, 2.85 g. of methyl acrylate, 33 mmol. of aluminum bromide and 100 ml. of toluene were mixed together in an atmosphere of nitrogen. The mixture was cooled to −78° C., and 27.8 g. of liquefied propylene was added. A solution of 33 mmol. of triethyl aluminum in toluene was added with stirring. 10 l. of nitrogen gas containing 5% of oxygen was blown into it for 1 hour. The reaction product was thrown into methanol and then refined. As a result, 1.42 g. of the white solid copolymer was obtained. From the result of its elementary analysis, it was confirmed to be an alternating copolymer.

EXAMPLE 9

The polymerization was carried out using 1.75 g. of acrylonitrile in place of methyl acrylate in the same apparatus as in Example 8. As a result, 1.56 g. of the white copolymer was obtained. The value of its nitrogen analysis was 14.46%, and agreed well with the calculated value of the 1:1 alternating copolymer, 14.72%.

EXAMPLE 10

Into a 200 ml. four-necked flask, 20 ml. of methylene chloride and 4 g. of methyl acrylate were introduced in an atmosphere of nitrogen and cooled to −78° C. 20 g. of vinyl chloride was liquefied in it and then 0.03 g. of cumene hydroperoxide was added. After 10 mmol. of ethylaluminum dichloride was added, the reaction was carried out with stirring for 2 hours. After-treatment was performed using methanol. As a result, 4.85 g. of the white solid copolymer was obtained. Under the same conditions of the polymerization, when cumene hydroperoxide was not used, 0.78 g. of the copolymer was obtained. In the case of using, in place of vinyl chloride, vinylidene chloride, allyl chloride or 2-chloro-propene-1, the same promoting effect of a peroxide was also observed.

EXAMPLE 11

Under the same conditions as in Example 1 excepting addition of 0.012 g. of cumene hydroperoxide, the polymerization was carried out at 25° C. for 5 hours. As a result, 4.04 g. of the white alternating copolymer was obtained. Its intrinsic viscosity as measured at 30° C. in benzene was 2.85 dl./g. In the same experiment, when cumene hydroperoxide was not added, 2.55 g. of the copolymer was obtained.

What is claimed is:
1. A method for producing an alternating copolymer which comprises polymerizing at a temperature of from −150° C. to +100° C. (A) an olefinic unsaturated compound having a general formula of

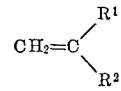

(wherein $R^1$ and $R^2$ each is a hydrogen atom, a halogen atom, a hydrocarbon group having 1 to 20 carbon atoms or a halogen containing hydrocarbon group having 1 to 20 carbon atoms) and (B) a conjugated vinyl compound selected from the group consisting of acrylonitrile and a compound having a general formula of

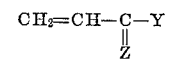

(wherein Z is oxygen or sulfur atom, Y is a member selected from the group consisting of Z′R, Z′H, —Z′)$_k$Me, NR′R″, an R radical, a halogen atom, and a hydrogen atom, Z′ is an oxygen or a sulfur atom, R is a hydrocarbon group having 1 to 20 carbon atoms, R′ and R″ are same or different members selected from the group consisting of a hydrogen atom and a hydrocarbon group having 1 to 20 carbon atoms, including the case where R′ and R″ are bonded together at the position other than nitrogen atom, and Me represents an element of Groups I to III of Mendeleev's Periodic Table, where $k$ is equal to the valency of Me, or an ammonium group with (C) an organo-aluminum halogen compound having a general formula of

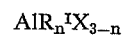

(wherein $R^I$ is a hydrocarbon group having 1 to 20 carbon atoms, X is a halogen atom, and $n$ is an arbitrary value of 1 to 2) or a combination of at least two components selected from the group consisting of aluminum compounds having the following general formulas:

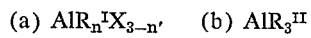

(wherein $R^{II}$ is a hydrocarbon group having 1 to 20 carbon atoms) and (c) AlX′$_3$ (wherein X′ is a halogen atom), wherein the compound of (C) is present in an amount of from 0.005 to 1.5 mole per mole of the group (B) conjugated monomer, and with (D) the addition of 0.01 to 100 mole percent of oxygen or an organic peroxide based on said organoaluminum halogen compound.

2. A method according to claim 1 wherein the organic peroxide is selected from the group consisting of a diacyl peroxide, a ketone peroxide, an aldehyde peroxide, an ether peroxide, a hydroperoxide, a dihydrocarbil peroxide, a peracid ester, a percarbonate and a percarbamate.

3. A method according to claim 1, wherein oxygen is added to the polymerization system alone, diluted with an inert gas, or diluted with one of the monomers.

4. A method according to claim 1 wherein an organic peroxide or oxygen is used in an amount of 0.001 to 20 mole percent based on the conjugated vinyl compound.

5. A method according to claim 1 wherein an organic peroxide is used in an amount of 0.1 to 20 mole percent based on the organoaluminum compound.

6. A method according to claim 1 wherein the organic peroxide is selected from the group consisting of benzoyl peroxide, acetyl peroxide, lauroyl peroxide, methylethylketone peroxide, cumene hydroperoxide, di-t-butyl peroxide and dicumyl peroxide.

7. A method according to claim 1 wherein the aluminum compound is dialkylaluminum halide, alkylaluminum sesquihalide or alkylaluminum dihalide.

8. A method according to claim 1 wherein the aluminum compound is a combination of at least two components selected from the group consisting of (a) dialkyl aluminum halide, alkylaluminum sesquihalide and alkylaluminum dihalide (b) trialkylaluminum and (c) aluminum halide.

9. A method according to claim 1 wherein the olefinic unsaturated compound is selected from the group consisting of aliphatic alpha-olefins, styrene, substituted styrenes, vinyl halides, vinylidene halides and allyl halides.

10. A method according to claim 1 wherein the conjugated vinyl compound is selected from the group consisting of an acrylate, a thioacrylate, a thionacrylate, a dithioacrylate, an acrylamide, a thioacrylamide, an N-substituted acrylamide, an N-substituted thioacrylamide, an N,N-disubstituted acrylamide, an N,N-disubstituted thioacrylamide, an acryloyl halide, a thioacryloyl halide, acrylic acid, thiolacrylic acid, thionacrylic acid, dithioacrylic acid, Groups I to III metal salts or ammonium salts of said acids, acrolein and a vinyl ketone.

References Cited

UNITED STATES PATENTS

| | | | |
|---|---|---|---|
| 3,159,607 | 12/1964 | D'Alelio | 260—82.1 |
| 3,169,079 | 2/1965 | Ferrington et al. | 117—124 |
| 3,183,217 | 5/1965 | Serniuk et al. | 260—85.5 |
| 3,272,786 | 9/1966 | Perry | 260—88.7 |
| 3,326,870 | 6/1967 | Nakaguchi et al. | 260—85.5 |

WILLIAM H. SHORT, Primary Examiner

L. L. LEE, Assistant Examiner

U.S. Cl. X.R.

260—73, 85.5, 87.5, 87.7, 89.7